United States Patent [19]
Ozono

[11] Patent Number: 5,203,160
[45] Date of Patent: Apr. 20, 1993

[54] COMBINED GENERATING PLANT AND ITS START-UP CONTROL DEVICE AND START-UP CONTROL METHOD

[75] Inventor: Jiro Ozono, Kanagawa, Japan

[73] Assignee: Kabushiki Kaisha Toshiba, Kawasaki, Japan

[21] Appl. No.: 779,093

[22] Filed: Oct. 18, 1991

[30] Foreign Application Priority Data

Oct. 18, 1990 [JP] Japan .................................. 2-280244

[51] Int. Cl.$^5$ .................................. F02C 6/00
[52] U.S. Cl. .................................. 60/39.02; 60/379.142; 60/39.182
[58] Field of Search .................. 60/39.02, 39.03, 39.26, 60/39.142, 39.182

[56] References Cited

U.S. PATENT DOCUMENTS

| | | | |
|---|---|---|---|
| 3,150,487 | 9/1964 | Mangan et al. | 60/39.182 |
| 4,081,956 | 4/1978 | Baker et al. | 60/39.182 |
| 4,519,207 | 5/1985 | Okabe et al. | 60/39.182 |
| 4,793,132 | 12/1988 | Okabe | 60/39.182 |
| 4,961,310 | 10/1990 | Moore et al. | 60/39.182 |
| 5,042,246 | 8/1991 | Moore et al. | 60/39.03 |

FOREIGN PATENT DOCUMENTS 0228711  11/1985  Japan .................................. 60/39.182

Primary Examiner—Richard A. Bertsch
Assistant Examiner—Howard R. Richman
Attorney, Agent, or Firm—Oblon, Spivak, McClelland, Maier & Neustadt

[57] ABSTRACT

A combined cycle generating plant wherein a gas turbine, a generator and a steam turbine are arranged on the same shaft, equipped with steam generating means that provides a source of high pressure steam and low pressure steam produced by the waste heat from the gas turbine, a high pressure steam regulating valve that controls the high pressure steam flowing into the high pressure turbine and a low pressure steam regulating valve that controls the low pressure steam, and provided with an auxiliary steam system for start-up purposes within the low pressure steam system. The plant also provides a start-up control device for start-up of the low pressure turbine using auxiliary steam from the auxiliary steam system when the combined cycle generating plant is in cold start condition and provides a start-up control device that controls start-up of the high pressure turbine when the combined cycle generating plant is in warm start condition.

19 Claims, 5 Drawing Sheets

COMBINED GENERATING PLANT AND ITS START-UP CONTROL DEVICE AND START-UP CONTROL METHOD

BACKGROUND OF THE INVENTION

1. Field of the Invention

The present invention relates to a combined generating plant constituted by combining a gas turbine and a steam turbine and its start-up control device and start-up control method.

2. Discussion of the Background

In general, in a combined cycle generating plant constituted by combining a gas turbine and a steam turbine, the hot gas that is discharged by the gas turbine after doing work is utilized to generate steam by heat exchange with water using a waste heat recovery boiler. This steam is then used to generate electricity by driving a steam turbine, thereby achieving more effective utilization of the heat energy.

One example of a combined cycle generating plant of this kind is a single-shaft combined cycle generating plant, as shown in FIG. 1. In this single-shaft combined cycle generating plant, a gas turbine 100 consisting of a compressor 101, a burner 102, and an expansion turbine 103, a generator 104, and a steam turbine 105 consisting of a high-pressure turbine 105a and a low-pressure turbine 105b are linked by a series of rotary shafts in skewer fashion. A start-up device 107 is coupled to one end of this rotary shaft, on the same side as compressor 101, through a torque converter 108.

In this construction, atmospheric air flows into and is compressed by compressor 101 so that liquid or gaseous fuel 109 can be burnt with it in burner 102, producing hot gas. The flow of fuel 109 is regulated by a fuel control value 118. Then, after performing work in expansion turbine 103, it is fed to a waste heat recovery boiler 111 of a steam generator 200 by a discharge duct. Steam generator 200 is provided with waste heat recovery boiler 111, high-pressure drum 112 and low-pressure drum 113. Waste heat recovery boiler 111 performs heat exchange with the hot waste gas from gas turbine 100, so that high-pressure steam is generated by high-pressure drum 112 and low-pressure steam is generated by low-pressure drum 113. The high-pressure steam generated in high-pressure drum 112 flows into high-pressure turbine 105a through main steam stop valve 115 of main steam pipe 114 and steam regulating valve 116.

In contrast, the low-pressure steam generated by low-pressure drum 113 is merged with the steam discharged from high-pressure turbine 105a and flows into low-pressure turbine 105b through low-pressure steam stop valve 118 of low-pressure steam pipe 117 and low-pressure steam regulating valve 119. After the steam has done work in low-pressure turbine 105b, it flows into a condenser 106, where it is condensed to form condensate which is returned to waste heat recovery boiler 111 by a water feed pump 120.

Main steam pipe 114 is provided with a high-pressure bypass pipe 121, whereby excess steam is transferred to condenser 106 through high-pressure bypass valve 122. Likewise low-pressure steam pipe 117 is provided with a low-pressure bypass pipe 123 whereby excess steam is transferred to condenser 106 through low-pressure bypass valve 124.

In start-up of the combined cycle generating plant, first gas turbine 100 must first be started. Start-up device 107 is provided for this purpose. The driving force of this start-up device 107 is transmitted to gas turbine 100 through torque converter 108.

The reason for this is that, in starting up gas turbine 100, air must be compressed by compressor 101, but compressor 101 does not operate unless gas turbine 100 is rotating. Start-up device 107 in therefore used to raise the speed of rotation of gas turbine 100 usually until it reaches about 60% of its rated speed. Compressor 101 is then actuated so that high-pressure turbine 103 is operated independently by means of hot gas generated by ignition of burner 102. Once gas turbine 100 is operating independently, start-up device 107 is no longer needed.

Thus, in start-up of a combined cycle generating plant, a start-up device 107 is required to start gas turbine 100.

However, with an increase in the capacity of gas turbine 100, the capacity of start-up device 107 must also be increased. Thus start-up device 107 becomes large in size and needs a high-power power source. Torque converter 108 also becomes large in capacity, resulting in increased size of the equipment and higher costs.

SUMMARY OF THE INVENTION

An object of this invention is to provide a combined cycle generating plant whereby even a high-capacity combined cycle generating plant can be easily started up.

A further object of this invention is to provide a start-up control device and method whereby start-up control of such a combined cycle generating plant can be effected from a cold condition.

Yet a further object of this invention is to provide a start-up control device and method whereby start-up control of such a combined cycle generating plant can be effected from a warm condition.

The objects of this invention described above can be achieved by a combined generating plant having a gas turbine driven by combustion of fuel and a steam turbine coupled to the gas turbine on a single shaft. A steam generation means is provided with a high-pressure drum for generating high-pressure steam and a low-pressure drum for generating low-pressure steam, by heat exchange with waste gas burnt in the gas turbine. First and second means introduce the high- and low-pressure steam to the steam turbine, respectively, the steam turbine being provided with a high-pressure turbine driven by introducing the high-pressure steam from the high-pressure drum via the first means and a low-pressure turbine driven by introducing the low-pressure steam from the low-pressure drum via the second means. The generating plant also includes an auxiliary steam system connected to the second means for supplying auxiliary low-pressure steam to the low-pressure turbine during start-up, a high-pressure steam regulating valve disposed in the first means for regulating a flow rate of high-pressure steam into the high-pressure turbine from the high-pressure drum, and a low-pressure steam regulating valve disposed in the second means for regulating a flow rate of low-pressure steam into the low-pressure turbine from the low-pressure drum and a flow rate of auxiliary low-pressure steam into the low-pressure turbine from the auxiliary steam system.

The combined generating plant may also include a start-up control device for effecting start-up in a cold start condition, using the low-pressure turbine, which consists of start-up preparation means, on being actuated by a start-up command, for determining whether the combined generating plant is in a cold start condition, and for actuating the auxiliary steam system when the cold start condition is recognized, rotational speed control means for controlling a speed of rotation of the low-pressure turbine to a set value of start-up speed of the low-pressure turbine by setting a degree of opening of the low-pressure steam regulating valve. The start-up device also includes a speed of rotation control and correction means for compensating for a change of rotational speed of the low-pressure turbine corresponding to an amount of rotational torque applied to the low-pressure turbine by the gas turbine when the fuel is introduced into the gas turbine by regulating the degree of opening of the low-pressure steam regulating valve, low-pressure turbine overheating prevention means, actuated when the speed of rotation of the low-pressure turbine reaches a predetermined value, for preventing the degree of opening of the low-pressure steam valve from falling below a predetermined value which supplies to the low-pressure turbine a predetermined minimum flow rate of the low-pressure steam, and start-up completion means for fully opening the low-pressure steam regulating valve when start-up of the combined generating plant is completed.

The rotational speed control means may include a rotational speed detector which outputs a detected speed signal, a rotational speed setter which outputs a set speed signal, means for calculating a deviation between the detected speed signal and the set speed signal and for outputting a deviation signal, conversion means for converting the deviation signal to a first signal corresponding to a degree of opening of the low pressure steam regulating valve, and subtracter means for subtracting the first signal from a second signal output by the speed of rotation control and correction means, and outputting a subtraction signal.

The low-pressure turbine overheating prevention means may include a low pressure steam detector which outputs a low pressure steam pressure signal, a function generator for calculating a degree of opening of the low pressure steam regulating valve signal based upon the low pressure steam pressure signal, a minimum degree of opening setter for outputting a minimum degree of opening of the low pressure steam regulating valve signal, first selection means for selecting one of the degree of opening signal and the minimum degree of opening signal, a fully closed command setter for outputting a fully closed signal, and second selection means for selecting one of the fully closed signal or a signal selected by the first selecting means.

The speed of rotation and correction means may include a fuel control means for detecting a degree of opening of a fuel control valve controlling a flow of the fuel to the gas turbine and for outputting a degree of opening of the fuel control valve signal, and conversion means for converting the degree of opening of the control valve signal and a low pressure steam pressure signal output from a low pressure steam detector into a compensation signal corresponding to an amount of rotational torque applied to the low pressure turbine by the gas turbine.

The start-up control device may further include selection means for selecting one of a signal selected by the selection means of the rotational speed and control means and the subtraction signal, start-up completion means for selectively outputting a fully open signal, adder means for adding the signal selected by the selection means with the fully open signal and outputting an added signal, and position control means for controlling the degree of opening of the low-pressure steam regulating valve based upon the added signal.

The auxiliary steam system may include an auxiliary steam header, a pressure regulating valve connected to said header, a first non-return valve connected between said pressure regulating valve and a point in said second means, a second non-return valve disposed in the second means between the point and the low-pressure drum, and a low-pressure steam pressure detector connected to the second means at the point.

The start-up preparation means may include a first valve drive means for opening the pressure regulating valve when the low-pressure steam has not been established in the low-pressure steam drum and a second valve drive means for opening a low-pressure steam stop valve disposed in the second means between the low-pressure regulating valve and the point.

A second embodiment in which the combined generating plant according to the invention includes a start-up control device for effecting start-up in a warm condition, using the high pressure turbine, including start-up preparation means, on being actuated by a start-up command, for determining whether the combined generating plant is in a warm start condition and for disabling speed of rotation control of the low-pressure turbine by the low-pressure steam regulating valve when the warm start condition is recognized, rotational speed control means for controlling a speed of rotation of a high pressure turbine to a set value of start-up speed by setting a degree of opening of the high pressure steam regulating valve, speed of rotation control and correction means for compensating for a change of rotational speed of the high pressure turbine corresponding to an amount of rotational torque applied by the gas turbine to the high pressure turbine when the fuel is introduced into the gas turbine by regulating the degree of opening of the high pressure steam regulating valve, high pressure turbine overheating prevention means, actuated when the rotational speed of the high pressure turbine reaches a predetermined value, for preventing the degree of opening of the high pressure steam regulating valve from falling below a predetermined value which applies to the high pressure turbine a predetermined flow rate of high pressure steam, and load control means for fully opening the high pressure steam regulating valve when start-up of the combined generating plant is completed and for shifting to pressure control of the high pressure drum.

The objects of the present invention are also achieved by a method for effecting start-up of a combined generating plant when in a cold start condition, including the steps of determining whether the combined generating plant is in a cold start condition, actuating the auxiliary steam system when the cold start condition is recognized, controlling a speed of rotation of the low pressure steam turbine to coincide with a set value of start-up speed of the low pressure turbine, whose speed of rotation is set beforehand, by regulating a degree of opening of the low pressure steam regulating valve, compensating for change of rotational speed of the low pressure turbine corresponding to an amount of rotational torque applied to the low pressure turbine by the gas turbine when fuel is introduced into the gas turbine, by further regulating the degree of opening of the low pressure steam regulating valve, supplying to the low pressure turbine a predetermined minimum flow rate of steam of the low pressure turbine when the rotational speed of the low pressure turbine reaches a predetermined value, and fully opening the low pressure steam regulating valve when start-up of the combined generating plant is completed.

The first embodiment of the method according to the present invention may also include the steps of regulating a flow of the auxiliary low pressure steam to the low pressure steam turbine when the low pressure steam in the low pressure drum has not been established; and introducing the low pressure steam from the low pressure drum after establishment thereof to the low pressure steam turbine and switching over from the auxiliary low pressure steam to low pressure steam from the low pressure drum when pressure in the low pressure drum reaches a predetermined value.

A second embodiment of the method according to the present invention where the combined generating plan is started up in a warm start condition, includes the steps of determining whether the combined generating plant is in a warm start condition, disabling speed of rotation control of the low-pressure turbine by the low-pressure steam regulating valve when the warm start condition is recognized, controlling the speed of rotation to coincide with a set value of start-up speed of the high-pressure turbine whose speed of rotation is set beforehand, by regulating the high-pressure steam regulating valve, compensating for the change of rotational speed of the high-pressure turbine corresponding to an amount of the rotational torque applied to the high-pressure turbine by the gas turbine when fuel is introduced into the ga turbine by further regulating the high-pressure steam regulating valve, supplying to the high-pressure turbine a predetermined minimum flow rate of steam when the rotational speed of the high-pressure turbine reaches a predetermined value, and shifting to pressure control of the high-pressure drum by fully opening the high-pressure steam regulating valve when start-up of the combined generating plant is completed.

The second embodiment of the method according to the invention may also include the steps of controlling the speed of the turbine using low-pressure steam from the low pressure drum and high-pressure steam by the high-pressure drum, fully opening the low-pressure regulating valve until a warm speed of the turbine is reached, and performing overheating prevention of the low pressure turbine from when the warm speed is reached until the generator is introduced into the plant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
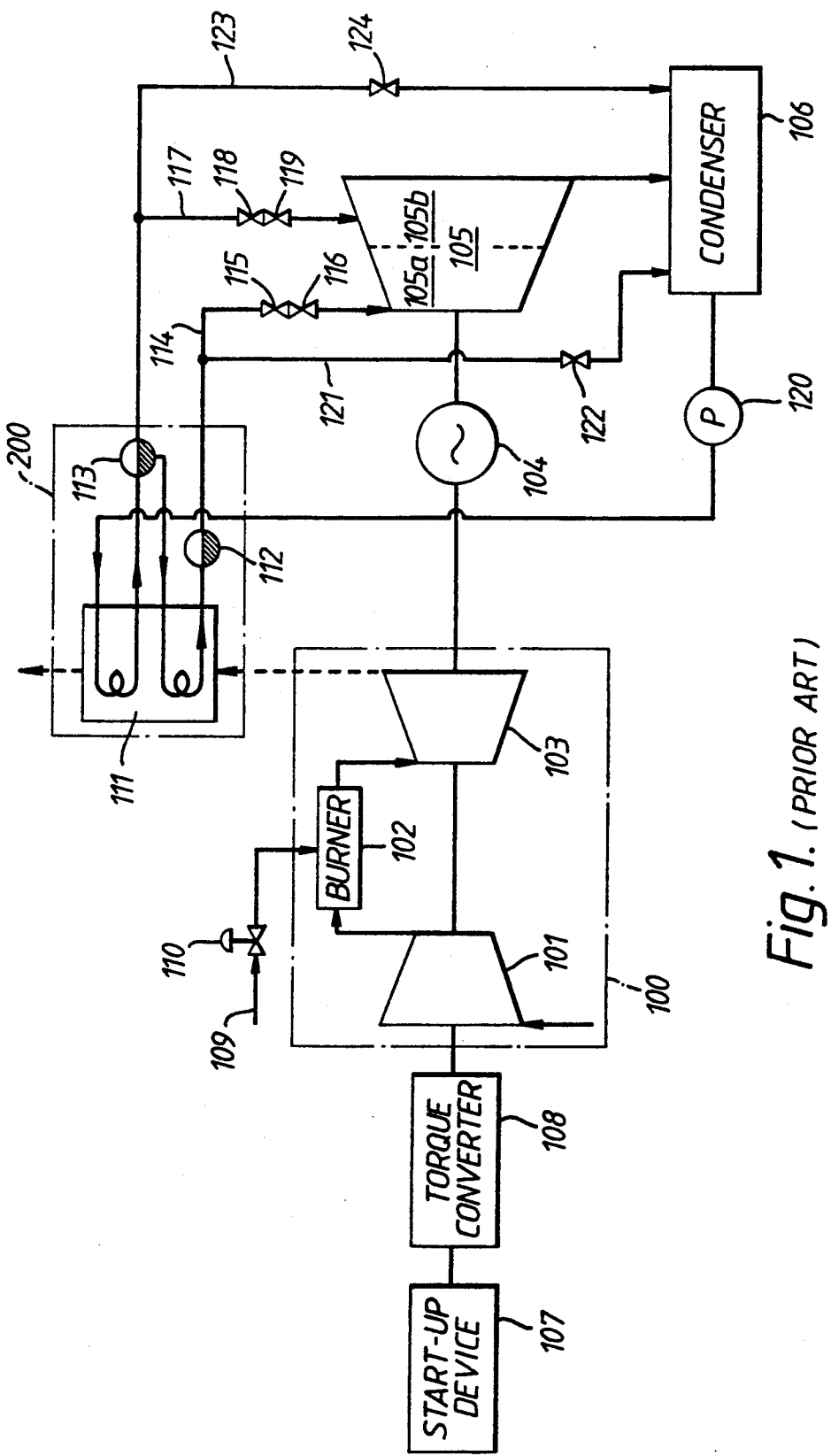
FIG. 1 is a system layout diagram of a conventional combined cycle generating plant.
Figure 2:
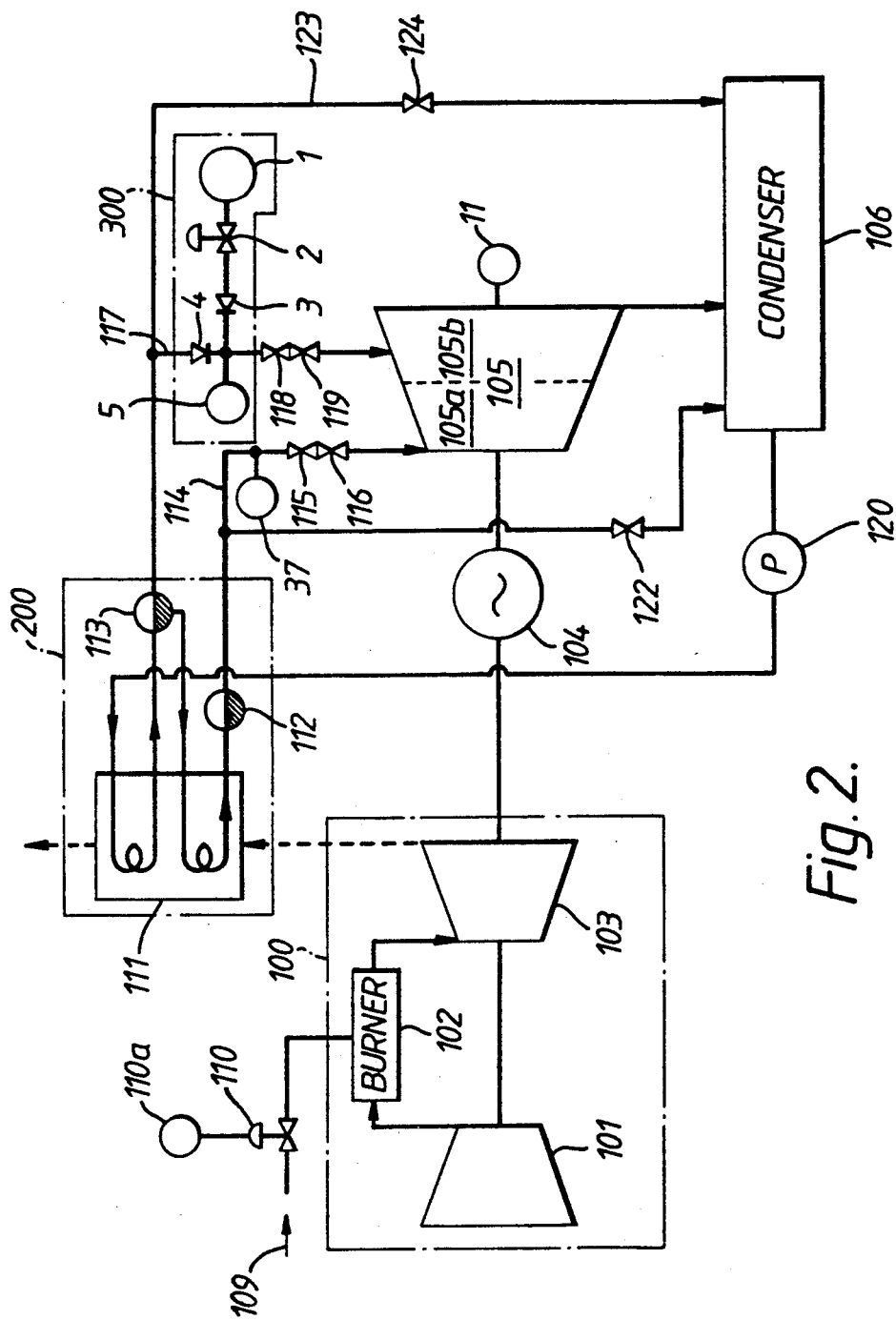
FIG. 2 is a system layout diagram of an embodiment of a combined cycle generating plant according to the invention.

Referring now to the drawings, wherein like reference numerals designate identical or corresponding parts throughout the several views, and more particularly to FIG. 2 thereof which shows an embodiment of a combined generating plant according to the invention, in contrast to the conventional combined generating plant of FIG. 1 which includes start-up device 107 and torque converter 108, the combined generating plant of the present invention includes an auxiliary steam system 300 for start-up. Auxiliary steam system 300 is constructed such that the steam of an auxiliary steam header 1 can be fed to low-pressure steam pipe 117 through pressure regulating valve 2 and non-return valve 3. On start-up of the combined generating plant, low-pressure steam stop valve 118 is fully opened, and the rate of steam flow is controlled by low-pressure steam regulating valve 119. The rotational speed of steam turbine 105 and gas turbine 100, which is coupled with steam turbine 105 on the same shaft, is thereby controlled.

A low-pressure steam pressure detector 5 is provided to detect the pressure of the steam flowing into low pressure turbine 105b which is required for this rotational speed control. A non-return valve 4 is provided between low-pressure steam stop valve 118 and low-pressure drum 113 to prevent back flow of the steam of auxiliary steam header I into low-pressure drum 113.

An embodiment of a start-up control device for such a combined cycle generating plant, for the case of starting up from a completely cold condition, is described with reference to FIG. 3. In this case, since the combined generating plant is in a completely cold condition, supply of steam from low-pressure drum 112 and low-pressure drum 113 is not established. On receiving a start-up command, a start-up preparation device 22 outputs a "fully open" command to a valve drive circuit 118a of low-pressure steam stop valve 118, fully opening low-pressure steam stop valve 118. In addition, start-up preparation device 22 determines, based on the low-pressure steam pressure detected by low-pressure steam pressure detection detector 5, whether supply of low-pressure steam to low-pressure drum 113 is established or not. If it is confirmed that supply of low-pressure steam is established, detector 5 issues an "open" command to a valve drive circuit 2a of pressure regulating valve 2 of auxiliary steam system 300. Regulating valve 2 is thereby opened, and maintains the steam pressure at the inlet of low-pressure turbine 105b at a prescribed value.

When start-up preparation is completed, the speed of rotation of the single-shaft system wherein low-pressure turbine 105b and gas turbine 100 are linked on a single shaft is controlled by using rotational speed control device 301 to adjust low-pressure steam regulating valve 119.

As will be described, contact 23b opens when starting up high-pressure turbine 105a in the warm condition, in which supply of steam from high-pressure drum 112 and low-pressure drum 113 has been established. In the cold condition, contact 23b is closed.

Figure 3:
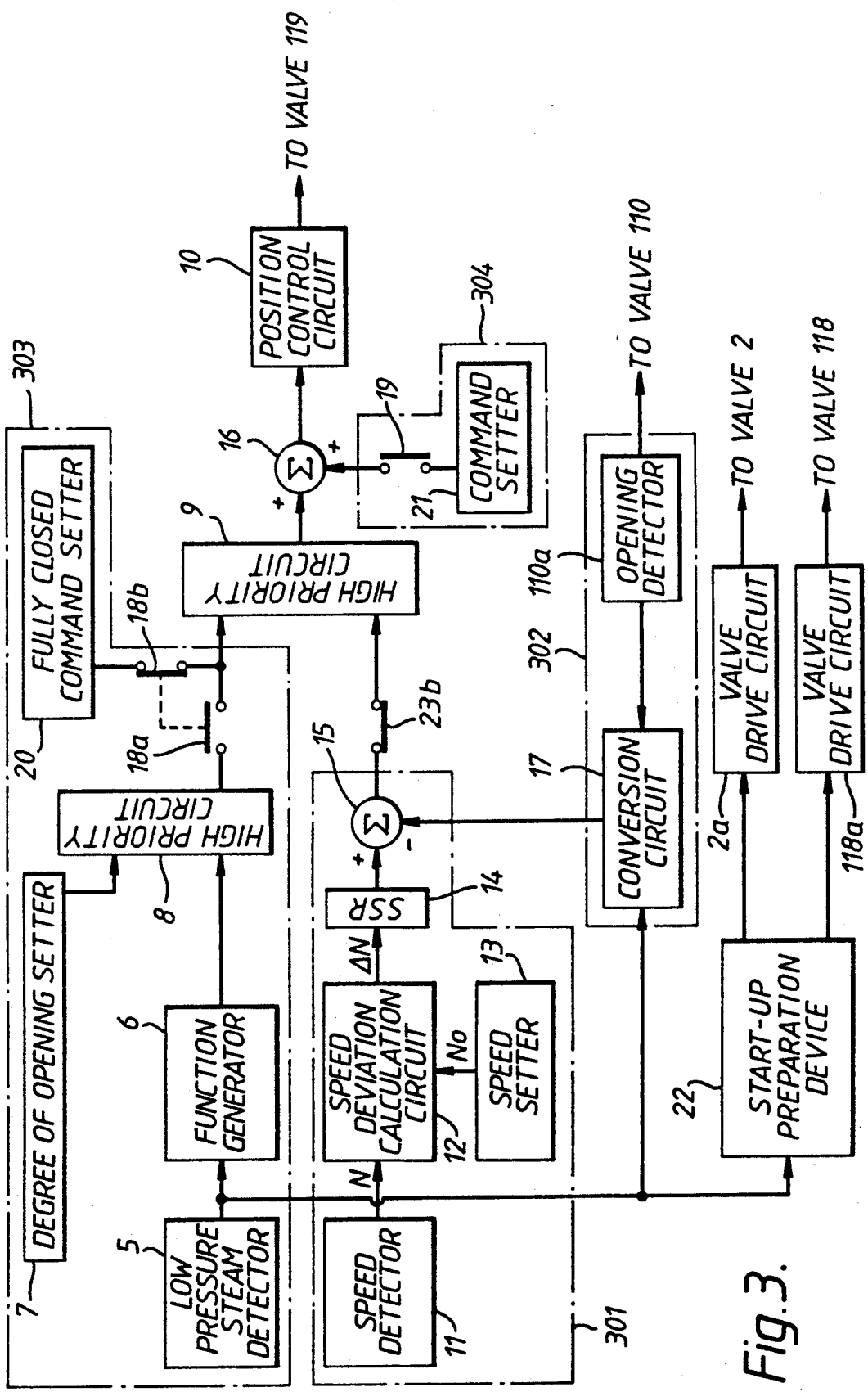
FIG. 3 is a block diagram of a start-up control device for starting up a low-pressure turbine of a combined cycle generating plant according to the invention.

In FIG. 3, rotational speed control device 301 is provided to increase the speed of low-pressure turbine 105b when in the cold condition, and calculates a "degree of opening" command of low-pressure steam regulating valve 119 for this purpose. A rotational speed correction device 302 is provided to compensate for the increased rotational torque that is applied to the single-shaft system when fuel supply to turbine 100 is turned on and ignited. A low-pressure turbine overheating prevention device 303 is provided to prevent overheating of the low-pressure turbine which may occur due to friction with the air present in the turbine chamber if the flow rate of steam into low-pressure turbine 105$b$ drops below a prescribed value when the rotational speed of low-pressure turbine 105$b$ has already risen to some extent. A start-up completion device 304 is provided to fully open low-pressure steam regulating valve 119 once start-up has been completed.

Rotational speed control device 301 uses a rotational speed deviation calculation circuit 12 to calculate the rotational speed deviation between low-pressure turbine rotational speed N detected by rotational speed detector 1 and set value $N_O$ of the turbine start-up speed previously set by a speed setter 13. The calculated rotational speed deviation $\Delta N$ is input to a start-up speed settlement ratio circuit 14 (SSR) where it is converted into a degree of opening command signal for low-pressure steam regulating valve 119. This degree of opening command signal is input to an adder 15. On start-up of low-pressure turbine 105$b$ the correction signal from rotational speed control correction device 302 is zero, so the degree of opening signal is then input directly to a high value priority circuit 9.

Also, on low-pressure turbine start-up, since the "fully closed" command signal of low-pressure steam regulating valve 119 is being output, high-value priority circuit 9 detects the output signal of an adder 15 and inputs to an adder 16 the output signal from a low-pressure turbine overheating prevention device 303, to be described. The input signal from start-up completion device 304 to adder 16 is zero in the start-up process of low-pressure turbine 105$b$, so the output signal of adder 16 is the output signal from high-value priority circuit 9. The output signal of adder 16 is input to a position control circuit 10 of low-pressure steam regulating valve 119 so that the degree of opening of low-pressure steam regulating valve 119 is thereby adjusted in accordance with rotational speed deviation $\Delta N$.

Figure 4:
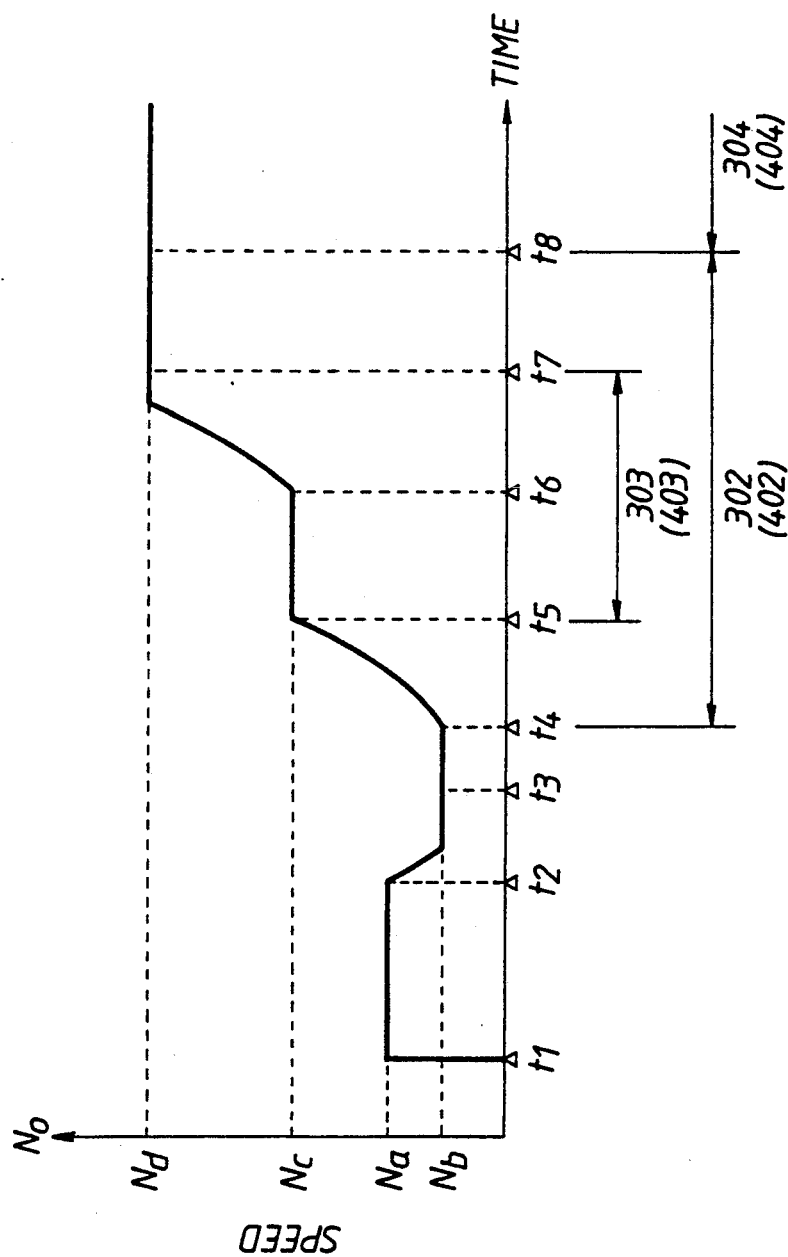
FIG. 4 is a time chart showing a start-up schedule of a combined cycle generating plant according to the invention.

FIG. 4 shows the speed pattern of turbine 100. The time periods shown are typically on the order of minutes. Set values $N_O$ are predetermined in speed setter 13. Namely, at the time zero point where the turbine start-up signal is received, the turbine speed set value is set to purge speed $N_a$. Purge speed $N_a$ is maintained for a period to make sure gas is purged from turbine 100. At the time-point $t_2$ where purging has been completed, the speed is set to a compressor speed $N_b$ lower than purge speed $N_a$. $N_b$ is the compressor speed for supplying the required quantity of air to the burner 102 during start-up of turbine 100. The quantity of air supplied is directly proportional to the speed of turbine 100, which is directly proportional to the quantity of fuel to be supplied to burner 102 during burner start-up. Thus, $N_b$ is determined by the quantity of fuel to be supplied to burner 102, which is a predetermined value. $N_b$ is typically less than $N_a$, as shown in FIG. 4. After speed $N_b$ has been stably held for a period, an ignition signal is applied to turbine 100 at time-point $t_3$. At the time-point $t_4$ where ignition of turbine 100 signal is detected, the set value of the speed is increased in ramp fashion up to warm speed $N_c$, which is reached at time-point $t_5$. Warm speed $N_c$ is maintained from time-point $t_5$ to time-point $t_6$. After warm-up of the turbine has been completed, the set speed value is further increased in ramp fashion until it is finally set at the rated speed $N_d$ of the turbine.

Time-point $t_7$ indicates the point where generator 104 is introduced into the power system. Time-point $t_8$ indicates the point where generator 104 starts to take up the initial load. Rotational speed control correction device 302 acts during the period from the gas turbine ignition recognition time-point $t_4$ to the time-point $t_8$ where the turbine starts to take up the initial load. Low-pressure turbine overheating prevention device 303 acts during the period from the warm starting time-point $t_5$ to the time-point t, where generator 104 is introduced. Start-up completion device 304 acts from the time-point $t_5$ where the initial load starts to be taken up.

Rotational speed control correction device 302 performs a compensating function of raising or maintaining the rotational speed of the turbine shaft when the fuel supply to gas turbine 100 is turned on and the fuel is ignited, in the turbine start-up process. That is, it serves to reduce the flow of steam to low-pressure turbine 105$b$ by an amount corresponding to the rotational torque provided by gas turbine 100.

When supply of fuel 109 to gas turbine 100 is turned on and ignited, fuel control by fuel control valve 110 is commenced. Since the flow characteristic of fuel control valve 110 is known, the degree of opening of this fuel control valve 110 expresses the rotational torque of gas turbine 100. The degree of opening of fuel control valve 110 is therefore detected by a degree of opening detector 110$a$ and input to a degree of opening conversion circuit 17. Degree of opening conversion circuit 17 converts the pressure of the low-pressure steam that is input from low-pressure steam pressure detector 5 into a signal that is input to a negative input of adder 15, corresponding to and correcting for the amount of the rotational torque of gas turbine 100. This signal is subtracted from the signal output by start-up speed settlement ratio circuit 14, thereby reducing the degree of opening signal fed to high priority circuit 9.

When the warm speed $N_c$ is reached during the start-up process, waste heat recovery boiler 111 gradually starts to generate steam. In conventional start-up of a single-shaft turbine, this low-pressure steam was discharged to condenser 16 from low-pressure bypass valve 124 (FIG. 1). In the start-up control according to the invention, however, at the time-point when it is established that low-pressure steam is being generated, low pressure steam is fed into low-pressure turbine 105$b$ through non-return valve 3 and low-pressure steam regulating valve 119. When the pressure of the low-pressure steam from drum 113 rises further, the system is switched over completely from the low-pressure steam supplied from auxiliary steam system 300 to the low-pressure steam from low-pressure drum 113, thereby eliminating consumption of the low-pressure steam of auxiliary steam system 300. When this condition is reached, low-pressure steam detection means 5 outputs a signal which causes start-up preparation means 22 to close pressure regulating valve 2 by mean of valve drive circuit 2$a$.

Low-pressure turbine overheating prevention device 303 is actuated by contact 18$a$ which closes in response to the rotational speed condition of the turbine start-up process. Specifically, low-pressure turbine overheating prevention device 303 is actuated at the time-point where supply of low-pressure steam from low-pressure drum 113 is established and the rotational speed of low-pressure turbine 105b has reached a fixed value, for example at the time-point $t_5$ where the warm speed $N_c$ has been reached.

In the unactuated condition of low-pressure turbine overheating prevention device 303 before the time-point $t_5$ at which warm speed $N_c$ is reached, contact 18a is open and contact 18b is closed. A fully closed command signal is therefore output to high-value priority circuit 9 from fully closed command setter 20 of low-pressure steam regulating valve 119. In the actuated condition from the time-point $t_5$ at which warm speed $N_c$ is reached up to the time-point $t_7$ at which generator 107 is introduced into the system, contact 18a is closed and contact 18b is open. A degree of opening command of low-pressure regulating valve 119 is therefore output from low-pressure turbine overheating prevention device 303 such that the degree of opening of low-pressure steam regulating valve 119 does not go below a minimum degree of opening necessary to provide a minimum flow rate of low-pressure steam which will prevent overheating of low-pressure turbine 105b. This minimum flow rate of low-pressure steam will be dependent upon the type of turbine used and the operating characteristics of the plant, as is apparent to one of ordinary skill in the art.

This minimum degree of opening depends on the condition of the low-pressure steam. If the steam pressure is high, the degree of valve opening must be set low, and if the steam pressure is low, the degree of valve opening must be set high. The reason for this is to ensure that the amount of steam that is supplied to low-pressure turbine 105b is more than a certain fixed value, and to reduce the amount of air, since the degree of overheating produced by friction with air in a low-pressure turbine increases with increase in the amount of air left in the turbine chamber.

A function generator 6 is therefore employed to calculate the degree of opening of low-pressure steam regulating valve 119 in accordance with the low-pressure steam pressure detected by a low-pressure steam pressure detector 5 such as to prevent overheating of low-pressure turbine 105b. The output of this function generator 6 is input to a high-value priority circuit 8.

High-value priority circuit 8 also receives as input a minimum degree of opening command of low-pressure steam regulating valve 119, from a minimum degree of opening setter 7. The largest of the output signals (greater degree of opening) from this minimum degree of opening setter 7 and function generator 6 is output to a high-value priority circuit 9.

In warm operation of low-pressure turbine 105b, the rotational speed of low-pressure turbine 105b is held constant at warm speed $N_c$, so steam for acceleration of low-pressure turbine 105b is not needed. Therefore, although the degree of opening command of low-pressure steam regulating valve 119 from rotational speed control device 301 may be less than the degree of opening command of low-pressure steam regulating valve 119 from low-pressure turbine overheating prevention device 303, since high-value priority circuit 9 selects the largest of the output signal from rotational speed control device 301 and the output signal from low-pressure turbine overheating prevention device 303, there is no possibility of low-pressure turbine 105b getting overheated.

Next, when generator 104 is introduced into the system, prevention of overheating of low-pressure turbine 105b becomes unnecessary, so contact 18a is opened and contact 18a is closed, i.e., low-pressure turbine overheating prevention device 303 is placed in an unactuated condition. When the initial load is taken up, contact 19 is closed and start-up completion device 304 is actuated. This causes a ramp-shaped fully open command signal of low-pressure steam regulating valve 119 to be output to adder 16 from a fully open command setter 21 of low-pressure steam regulating valve 119, making low-pressure steam regulating valve 119 fully open. Start-up control is thereby terminated.

Figure 5:
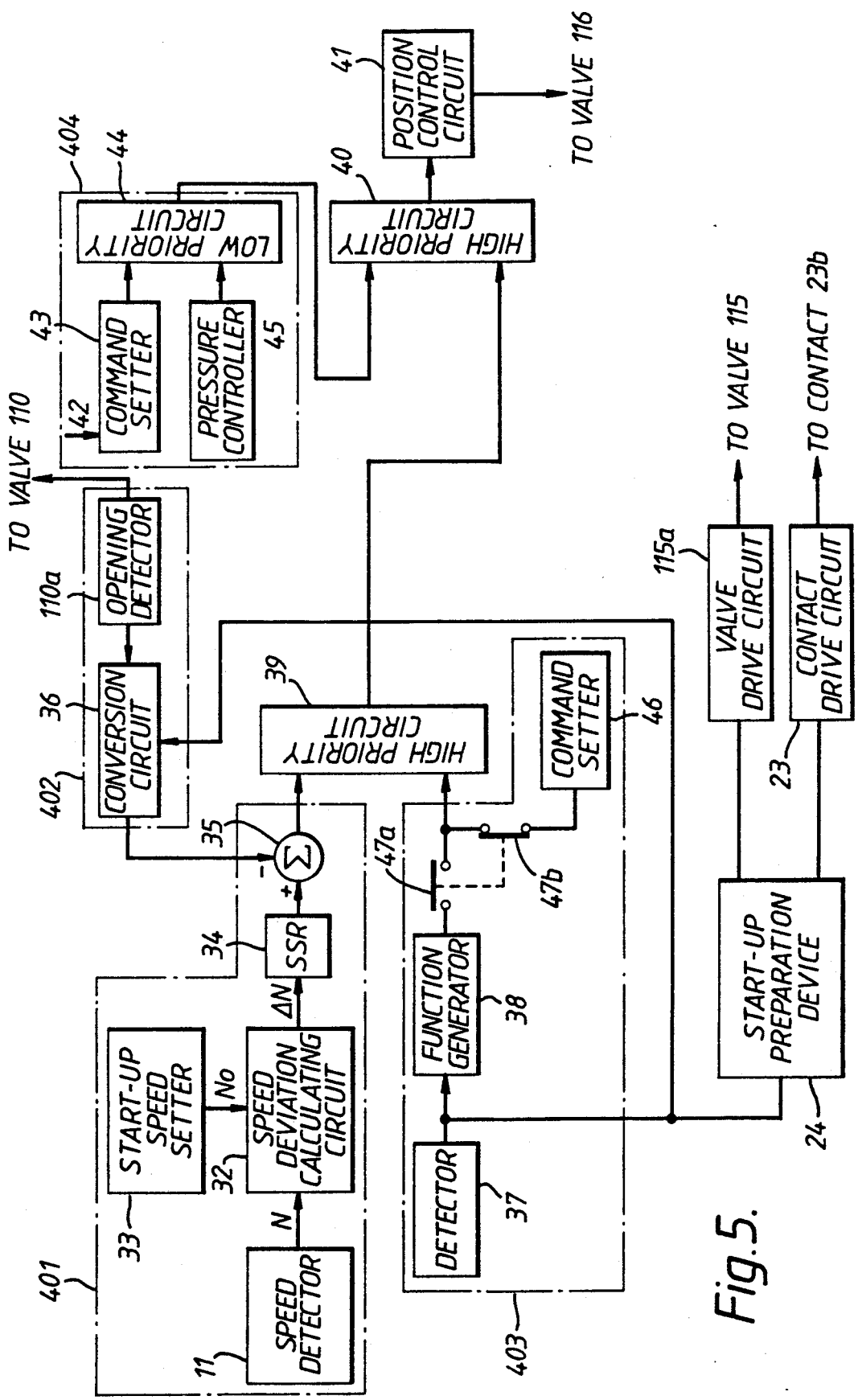
FIG. 5 is a block diagram showing a start-up control device for starting up a high-pressure turbine of a combined cycle generating plant according to the invention.

Next, start-up control in the warm condition where steam is present in high-pressure drum 112 and low-pressure drum 113 will be described with reference to FIG. 5.

When start-up preparation device 24 receives a start-up command, it outputs a fully open command to valve drive circuit 115a of high-pressure steam stop valve 115, thereby fully opening pressure steam stop valve 115. Furthermore, start-up preparation device 24 determines, based on the high-pressure steam pressure detected by high-pressure steam detector 37, whether a supply of steam from high-pressure drum 112 has been established. If a supply of steam from high-pressure drum 112 has been established, start-up preparation device 24 outputs an actuation command of a contact drive circuit 23, causing contact 23b to open. Rotational speed control of low-pressure turbine 105b is thereby disabled. In the warm condition, this completes start-up preparation.

In the case of start-up by high-pressure turbine 105a in the warm condition, as in the case of start-up by low-pressure turbine 105b, there are provided a rotational speed control device 401, a rotational speed control correction device 402, a high-pressure turbine overheating prevention device 403, and a load control device 404 instead of start-up completion device 304. As in the case of start-up of low-pressure turbine 105b, FIG. 4 shows the timings of actuation of rotational speed control correction device 402, high-pressure turbine overheating prevention device 403, and load control device 404.

First of all, the rotational speed N of the turbine shaft is detected by a rotational speed detector 11. A rotational speed deviation calculating circuit 32 then compares this with set value $N_O$ of the turbine start-up speed of high-pressure turbine 105a as set by a start-up speed setter 33. The start-up speed set value of high-pressure turbine 105a set by start-up speed setter 33 is determined by the starting characteristic of gas turbine 100 irrespective of start-up by auxiliary steam and/or steam from high-pressure drum 112 and low-pressure drum 113. It is therefore the same as the speed set value $N_O$ of FIG. 3. Rotational speed deviation signal $\Delta N$ is converted by a start-up speed settlement ratio circuit 34 (SSR) into a degree of opening command signal of high-pressure steam regulating valve 116, and input to adder 35. Adder 35 subtracts from it the output signal of rotational speed control correction device 402. A degree of opening conversion circuit 36 then converts the degree of opening detected by a degree of opening detector 110a of fuel control valve 110 into a degree of opening of high-pressure steam regulating valve 116, determined by the steam pressure condition of high-pressure drum 112 detected by detector 37. Since the degree of opening of high-pressure steam regulating valve 116 after this conversion process is subtracted, a degree of opening command signal of high-pressure steam regulating valve 116 is output by adder 35 with the energy of the supplied fuel already subtracted. When the acceleration energy of gas turbine 100 increases, the turbine shaft turns independently, and the degree of opening of high-pressure steam regulating, valve 116 decreases.

However, as the rated rotational speed of the turbine shaft is approached, a minimum degree of opening of high-pressure steam regulating valve 116 necessary to provide a minimum flow rate of high pressure steam which will prevent overheating of high-pressure turbine 105a is met. This minimum flow rate of high-pressure steam will be dependent upon the type of turbine used and the operating characteristics of the plant, as is apparent to one of ordinary skill in the art. This function is provided by high-pressure turbine overheating prevention device 403. A function generator 38 outputs the minimum degree of opening of high-pressure steam regulating valve 116 determined by the function of steam pressure of high-pressure drum 112 detected by high-pressure steam pressure detector 37. If the steam pressure of high-pressure drum 112 is high, the degree of opening is small, but if the steam pressure is low the degree of opening is large. The amount of steam flowing into high-pressure turbine 105a is therefore kept practically constant, so overheating is prevented. A high-value priority circuit 39 selects and outputs the highest one of the degree of opening command signals of high-pressure steam regulating valve 116 provided by adder 35 and function generator 38 respectively and inputs this to a position control circuit 41 of high-pressure steam regulating valve 116 through a high-value priority circuit 40.

At the low rotational speed obtaining during the process of starting up rotation of the turbine shaft, there is no possibility of overheating of high-pressure turbine 105a, so function generator 38 does not need to be actuated. A fully closed command setter 46 of high-pressure steam regulating valve 116 therefore inputs a fully closed command signal to high-value priority circuit 39 through a contact 47b. The actuation conditions for opening and closing of contacts 47a and 47b are essentially the same as those of contacts 18a and 18b for low-pressure steam regulating valve 119.

Thus when the rated speed of rotation is reached, start-up control of the turbine shaft by the steam of the high-pressure drum is no longer needed, so high-pressure steam regulating valve 116 must be changed over automatically to the pressure control circuit of high-pressure drum 112. Accordingly, when start-up control is completed, control is changed over to load control device 404. In response to the "generator introduced" condition 42 of the turbine shaft, i.e., the condition that generator 104 has been introduced into the power system, a "fully open" command setter 43 of high-pressure steam regulating valve 116 outputs a degree of opening command that changes the degree of opening in ramp fashion from 0% to 100%. The output signal of "fully open" command setter 43 of high-pressure steam regulating valve 116 is input to a low-value priority circuit 44 where it is compared with the output signal from pressure control circuit 45 of high-pressure drum 112, so that the lowest of these degree of opening command signals of high-pressure steam regulating valve 116 in output. That is, during normal load operation of the turbine shaft, high-pressure steam regulating valve 116 is fully open. If for some reason the pressure of high-pressure drum 112 falls, high-pressure steam regulating valve 116 is throttled by pressure control circuit 45 of high-pressure drum 112.

The output signal of low-value priority circuit 44 is input, together with the output signal of high-value priority circuit 39, to high-value priority circuit 40, where the largest of these is selected and thence input to position control circuit 41 of high-pressure steam regulating valve 116.

Next, such control of low-pressure steam regulating valve 119 in the case of turbine shaft start-up in warm condition using the steam of high-pressure drum 112 will be described. In this case, if start-up speed control by both high-pressure steam regulating valve 116 and low-pressure steam regulating valve 119 are performed in parallel, interference between these two may occur, causing problems of stability of control. Turbine shaft start-up by high-pressure steam regulating valve 116, which has the largest energy source, is therefore given priority. Fixed degree of opening control of low-pressure steam regulating valve 119, in which there is no feed-back of the speed of rotation of the turbine shaft, is therefore carried out.

For example, from rest to below about 60% of the rated speed of rotation of the turbine shaft, there is no risk of overheating of low-pressure turbine 105b, so the operation of opening low-pressure steam regulating valve 119 is not necessary. Control is therefore performed such that low-pressure steam regulating valve 119 is fully open from the starting time-point $t_1$ up to the time-point $t_5$ where warm speed $N_c$ is reached, during which period there is no risk of overheating low-pressure turbine 105b. But, low-pressure turbine overheating prevention device 30 acts from time-point $t_5$ to time-point $t_7$, at which the risk of overheating disappears. This is achieved by opening contact 23b in FIG. 3, disabling the output signal of rotational speed control device 303 of low-pressure turbine 105b, and enabling the output signals of low-pressure turbine overheating prevention device 303 and start-up completion device 304.

As described above, with this invention, there is the benefit that installation operation with high energy efficiency can be achieved in that the turbine shaft of a combined generating plant can be started up without requiring a start-up device such as a start-up motor or torque converter, by employing the steam energy respectively stored in an auxiliary steam system or a high-pressure drum.

While the combined generating plant according to the invention has been disclosed as including a plurality of devices for carrying out start-up in both warm and cold start conditions, it is to be understood that some of the functions carried out by these devices may be implemented in software.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United States is:

1. A method for effecting start-up of a combined generating plant when in a cold start condition, said plant having a gas turbine, a steam turbine and a generator coupled to a single shaft, said steam turbine having a low-pressure steam turbine and a high-pressure steam turbine driven by introducing high-pressure steam from a high-pressure drum and low-pressure steam from a low-pressure drum thereto, respectively, an auxiliary steam system for supplying auxiliary low-pressure steam to said low-pressure turbine, and high- and low-pressure steam regulating valves for regulating flow rates of the high- and low-pressure steam, respectively, using said low-pressure turbine, comprising the following steps:

- determining whether said combined generating plant is in a cold start condition;
- actuating said auxiliary steam system when the cold start condition is recognized;
- controlling a speed of rotation of said low-pressure steam turbine to coincide with a set value of start-up speed of said low-pressure steam turbine, whose speed of rotation is set beforehand, by regulating a degree of opening of said low-pressure steam regulating valve;
- compensating for a change of rotational speed of said low-pressure steam turbine corresponding to an amount of rotational torque applied to said low-pressure steam turbine by said gas turbine when fuel is introduced into said gas turbine, by further regulating said degree of opening of said low-pressure steam regulating valve;
- supplying to said low-pressure steam turbine a predetermined minimum flow rate of steam of said low-pressure steam when the rotational speed of said low-pressure turbine reaches a predetermined value; and
- fully opening said low-pressure steam regulating valve when start-up of said combined generating plant is completed.

2. A method according to claim 1, further comprising:
- regulating a flow of said auxiliary low-pressure steam to said low-pressure steam turbine when said low-pressure steam in said low pressure drum has not been established.

3. A method according to claim 1, further comprising:
- introducing said low-pressure steam from said low-pressure drum after establishment thereof to said low-pressure steam turbine; and
- switching over from said auxiliary low-pressure steam to said low-pressure steam from said low-pressure drum when pressure in said low-pressure drum reaches a predetermined value.

4. A method for effecting start-up of a combined generating plant, using a high-pressure steam turbine, when the combined generating plant is in a warm start condition, said plant having a gas turbine, a steam turbine and a generator coupled to a single shaft, said steam turbine having said high pressure steam turbine and a low-pressure steam turbine driven by introducing high-pressure steam from a high-pressure drum and low-pressure steam from a low-pressure drum thereto, respectively, an auxiliary steam system for supplying auxiliary low-pressure steam to said low-pressure steam turbine, and high- and low-pressure steam regulating valves for regulating flow rates of the high- and low-pressure steam, respectively, comprising the following steps:

- determining whether said combined generating plant is in a warm start condition;
- disabling speed of rotation control of the low-pressure steam turbine by said low-pressure steam regulating valve when the warm start condition is recognized;
- controlling a speed of rotation of said low-pressure steam turbine to coincide with a set value of start-up speed of said high-pressure steam turbine whose speed of rotation is set beforehand, by regulating said high-pressure steam regulating valve;
- compensating for the change of rotational speed of said high-pressure steam turbine corresponding to an amount of the rotational torque applied to said high-pressure steam turbine by said gas turbine when fuel is introduced into said gas turbine by further regulating said high-pressure steam regulating valve;
- supplying to said high-pressure steam turbine a predetermined minimum flow rate of steam when the rotational speed of said high-pressure steam turbine reaches a predetermined value; and
- shifting to pressure control of said high-pressure drum by fully opening said high-pressure steam regulating valve when start-up of said combined generating plant is completed.

5. A method according to claim 4, further comprising:
- controlling a speed of said low-pressure steam turbine using low-pressure steam from said low-pressure drum and high-pressure steam from said high-pressure drum;
- fully opening said low-pressure steam regulating valve until a warm speed of said low-pressure steam turbine is reached; and
- performing overheating prevention of said low-pressure steam turbine from when said warm speed is reached until said generator is introduced into said plant.

6. A method according to claim 4, further comprising:
- determining said start-up speed of said high-pressure steam turbine based upon a starting characteristic of said gas turbine irrespective of start-up by said auxiliary low-pressure steam and said high-pressure steam.

7. A method according to claim 4, further comprising: introducing said generator to said plant; and fully opening said high-pressure steam regulating valve.

8. A combined generating plant, comprising:
- a gas turbine driven by combustion of fuel;
- a steam turbine;
- a generator coupled to said gas turbine and said steam turbine on a single shaft;
- steam generation means provided with a high-pressure drum for generating high-pressure steam and a low-pressure drum for generating low-pressure steam, by heat exchange with waste gas burnt in said gas turbine;
- first and second means for introducing said high- and low-pressure steam to said steam turbine, respectively, said steam turbine being provided with a high-pressure turbine driven by introducing the high-pressure steam from said high-pressure drum via said first means and a low-pressure turbine driven by introducing the low-pressure steam from said low-pressure drum via said second means;
- an auxiliary steam system connected to said second means for supplying auxiliary low-pressure steam to said low-pressure turbine during start-up;
- a high-pressure steam regulating valve disposed in said first means for regulating a flow rate of high-pressure steam into said high-pressure turbine from said high-pressure drum;

a low-pressure steam regulating valve disposed in said second means for regulating a flow rate of low-pressure steam into said low-pressure turbine from said low-pressure drum and a flow rate of auxiliary low-pressure steam into said low-pressure turbine from said auxiliary steam system; and a start-up control device for effecting start-up in a cold start condition, using said low-pressure turbine, comprising:

start-up preparation means, on being actuated by a start-up command, for determining whether said combined generating plant is in a cold start condition, and for actuating said auxiliary steam system when the cold start condition is recognized, rotational speed control means for controlling a speed of rotation of said low-pressure turbine to a set value of start-up speed of said low-pressure turbine by setting a degree of opening of said low-pressure steam regulating valve, speed of rotation control and correction means for compensating for a change of rotational speed of said low-pressure turbine corresponding to an amount of rotational torque applied to said low-pressure turbine by said gas turbine when said fuel is introduced into said gas turbine by regulating said degree of opening of said low-pressure steam regulating valve, low-pressure turbine overheating prevention means, actuated when the speed of rotation of said low-pressure turbine reaches a predetermined value, for preventing said degree of opening of said low-pressure steam regulating valve from falling below a predetermined value which supplies to said low-pressure turbine a predetermined minimum flow rate of said low-pressure steam, and start-up completion means for fully opening said low-pressure steam regulating valve when start-up of said combined generating plant is completed.

9. A combined generating plant according to claim 8, wherein said rotational speed control means comprises:

a rotational speed detector which outputs a detected speed signal;

a rotational speed setter which outputs a set speed signal;

means for calculating a deviation between said detected speed signal and said set speed signal and for outputting a deviation signal;

conversion means for converting said deviation signal to a first signal corresponding to a degree of opening of said low-pressure steam regulating valve; and subtracter means for subtracting said first signal from a second signal output by said speed of rotational control and correction means, and outputting a subtraction signal.

10. A combined generating plant according to claim 8, wherein said low-pressure turbine overheating prevention means comprises:

a low-pressure steam detector which outputs a low-pressure steam pressure signal;

a function generator for calculating a degree of opening of said low-pressure steam regulating valve signal based upon said low-pressure steam pressure signal;

a minimum degree of opening setter for outputting a minimum degree of opening of said low-pressure steam regulating valve signal;

first selection means for selecting one of said degree of opening signal and said minimum degree of opening signal;

a fully closed command setter which outputs a fully closed signal; and second selection means for selecting one of said fully closed signal and a signal selected by said first selecting means.

11. A combined generating plant according to claim 8, wherein said speed of rotation and correction means comprises:

fuel control means for detecting a degree of opening of a fuel control valve controlling a flow of said fuel to said gas turbine and for outputting a degree of opening of said fuel control valve signal; and conversion means for converting said degree of opening of said fuel control valve signal and a low-pressure steam pressure signal output from a low-pressure steam detector into a compensation signal corresponding to said amount of rotational torque applied to said low-pressure turbine by said gas turbine.

12. A combined generating plant according to claim 8, wherein said start-up control device comprises:

a low-pressure steam detector which outputs a low-pressure steam pressure signal;

a function generator for calculating a degree of opening of said low-pressure steam regulating valve signal based upon said low-pressure steam pressure signal;

a minimum degree of opening setter for outputting a minimum degree of opening of said low-pressure steam regulating valve signal;

first selection means for selecting one of said degree of opening signal and said minimum degree of opening signal;

a fully closed command setter which outputs a fully closed signal;

second selection means for selecting one of said fully closed signal and a signal selected by said first selection means;

fuel control means for detecting a degree of opening of a fuel control valve controlling a flow of said fuel to said gas turbine and for outputting a degree of opening of said fuel control valve signal;

first conversion means for converting said degree of opening of said fuel control valve signal and said low-pressure steam pressure signal output into a compensation signal corresponding to said amount of rotational torque applied to said low-pressure turbine by said gas turbine;

a rotational speed detector which outputs a detected speed signal;

a rotational speed setter which outputs a set speed signal;

means for calculating a deviation between said detected speed signal and said set speed signal and for outputting a deviation signal;

second conversion means for converting said deviation signal to a first signal corresponding to a degree of opening of said low-pressure steam regulating valve;

subtracter means for subtracting said first signal from said compensation signal and outputting a subtraction signal;

third selection means for selecting one of a signal selected by said second selection means and said subtraction signal;
start-up completion mean for selectively outputting a fully open signal;
adder means for adding a signal selected by said third selection means with said fully open signal and outputting an added signal; and
position control means for controlling said degree of opening of said low-pressure steam regulating valve based upon said added signal.

13. A combined generating plant according to claim 8, wherein said auxiliary steam system comprises:
an auxiliary steam header;
a pressure regulating valve connected to said header;
a first non-return valve connected between said pressure regulating valve and a point in said second means;
a second non-return valve disposed in said second means between said point and said low-pressure drum; and
a low pressure steam pressure detector connected to said second means at said point; and
wherein said start-up preparation means further comprises:
first valve drive means for opening said pressure regulating valve when said low-pressure steam has not been established in said low-pressure steam drum; and
second valve drive means for opening a low-pressure steam stop valve disposed in said second means between said low-pressure steam regulating valve and said point.

14. A combined generating plant, comprising:
a gas turbine driven by combustion of fuel;
a steam turbine;
a generator coupled to said gas turbine and said steam turbine on a single shaft;
steam generation means provided with a high-pressure drum for generating high-pressure steam and a low-pressure drum for generating low-pressure steam, by heat exchange with waste gas burnt in said gas turbine;
first and second means for introducing said high- and low-pressure steam to said steam turbine, respectively, said steam turbine being provided with a high-pressure turbine driven by introducing the high-pressure steam from said high-pressure drum via said first means and a low-pressure turbine driven by introducing the low-pressure steam from said low-pressure drum via said second means;
an auxiliary steam system connected to said second means for supplying auxiliary low-pressure steam to said low-pressure turbine during start-up;
a high-pressure steam regulating valve disposed in said first means for regulating a flow rate of high-pressure steam into said high-pressure turbine from said high-pressure drum;
a low-pressure steam regulating valve disposed in said second means for regulating a flow rate of low-pressure steam into said low-pressure turbine from said low-pressure drum and a flow rate of auxiliary low-pressure steam into said low-pressure turbine from said auxiliary steam system; and
a start-up control device for effecting start-up in a warm start condition, using said high-pressure turbine, comprising:

start-up preparation means, on being actuated by a start-up command, for determining whether said combined generating plant is in a warm start condition, and for disabling speed of rotation control of the low-pressure turbine by said low-pressure steam regulating valve when the warm start condition is recognized,
rotational speed control means for controlling a speed of rotation of said high-pressure turbine to a set value of start-up speed by setting a degree of opening of said high-pressure steam regulating valve,
speed of rotation control and correction means for compensating for a change of rotational speed of said high-pressure turbine corresponding to an amount of rotational torque applied by said gas turbine to said high-pressure turbine when said fuel is introduced into said gas turbine by regulating said degree of opening of said high-pressure steam regulating valve,
high-pressure turbine overheating prevention means, actuated when the rotational speed of said high-pressure turbine reaches a predetermined value, for preventing said degree of opening of said high-pressure steam regulating valve from falling below a predetermined value which supplies to said high-pressure turbine a predetermined minimum flow rate of said high-pressure steam, and
load control means for fully opening said high-pressure steam regulating valve when start-up of said combined generating plant is completed, and for shifting to pressure control of said high-pressure drum.

15. A combined generating plant according to claim 14, wherein said rotational speed control means comprises:
a rotational speed detector which outputs a detected speed signal;
a rotational speed setter which outputs a set speed signal;
means for calculating a deviation between said detected speed signal and said set speed signal and for outputting a deviation signal;
conversion means for converting said deviation signal to a first signal corresponding to a degree of opening of said high-pressure steam regulating valve; and
subtracter means for subtracting said first signal from a second signal output by said speed of rotational control and correction means, and outputting a subtraction signal.

16. A combined generating plant according to claim 14, wherein said high-pressure turbine overheating prevention means comprises:
a high-pressure steam pressure detector which outputs a high-pressure steam pressure signal;
a function generator for calculating a degree of opening of said high-pressure steam regulating valve signal based upon said high-pressure steam pressure signal;
a fully closed command setter which outputs a fully closed command signal; and
selection means for selecting one of said degree of opening signal and said fully closed command signal.

17. A combined generating plant according to claim 14, wherein said speed of rotation control and correction means comprises:

fuel control means for detecting a degree of opening of a fuel control valve controlling a flow of said fuel to said gas turbine and for outputting a degree of opening of said fuel control valve signal; and conversion means for converting said degree of opening of said fuel control valve signal and a high-pressure steam pressure signal output from a high-pressure steam detector into a compensation signal corresponding to said amount of rotational torque applied to said high-pressure turbine by said gas turbine.

18. A combined generating plant according to claim 14, wherein said load control means comprises:

a fully open command setter which outputs a fully open command signal;

a pressure controller which controls the pressure of said high-pressure steam drum and outputs a degree of opening of said high-pressure regulating valve signal;

selection means for selecting one of said fully open command signal and said degree of opening signal.

19. A combined generating plant according to claim 14, wherein said start-up control device comprises:

a high-pressure steam pressure detector which outputs a high-pressure steam pressure signal;

a function generator for calculating a degree of opening of said high-pressure steam regulating valve signal based upon said high-pressure steam pressure signal;

a fully closed command setter which outputs a fully closed command signal;

first selection means for selecting one of said degree of opening signal and said fully closed command signal;

fuel control means for detecting a degree of opening of a fuel control valve controlling a flow of said fuel to said gas turbine and for outputting a degree of opening of said fuel control valve signal;

first conversion means for converting said degree of opening of said fuel control valve signal and a high-pressure steam pressure signal output from said high-pressure steam detector into a compensation signal corresponding to said amount of rotational torque applied to said high-pressure turbine by said gas turbine;

a rotational speed detector which outputs a detected speed signal;

a rotational speed setter which outputs a set speed signal;

means for calculating a deviation between said detected speed signal and said set speed signal and for outputting a deviation signal;

second conversion means for converting said deviation signal to a first signal corresponding to a degree of opening of said low-pressure steam regulating valve;

subtracter means for subtracting said first signal from said compensation signal and for outputting a subtraction signal;

a fully open command setter which outputs a fully open command signal;

a pressure controller which controls the pressure of said high-pressure steam drum and outputs a degree of opening of said high-pressure steam regulating valve signal;

second selection means for selecting one of said fully open command signal and said degree of opening of said high-pressure steam regulating valve signal;

third selection means for selecting one of a signal selected by said first selection means and said subtraction signal;

fourth selection means for selecting one of a signal selected by said third selection means and a signal selected by said second selection means; and position control means for controlling said degree of opening of said high-pressure steam regulating valve based upon a signal selected by said fourth selection means.

* * * * *